(12) United States Patent
Chew et al.

(10) Patent No.: US 7,926,282 B2
(45) Date of Patent: Apr. 19, 2011

(54) PURE AIR BLAST FUEL INJECTOR

(75) Inventors: Gary W. Chew, Osceola, IA (US);
Viraphand Cholvibul, Urbandale, IA (US)

(73) Assignee: Delavan Inc, West Des Moines, IA (US)

(*) Notice: Subject to any disclaimer, the term of this patent is extended or adjusted under 35 U.S.C. 154(b) by 895 days.

(21) Appl. No.: 12/041,820

(22) Filed: Mar. 4, 2008

(65) Prior Publication Data
US 2009/0224080 A1 Sep. 10, 2009

(51) Int. Cl.
*F02C 1/00* (2006.01)
*F02G 3/00* (2006.01)

(52) U.S. Cl. ......... 60/748; 239/428; 239/403; 60/742

(58) Field of Classification Search ........... 239/398, 239/418, 422–425, 428, 403–406; 60/748, 60/737, 740, 742, 743
See application file for complete search history.

(56) References Cited

U.S. PATENT DOCUMENTS

| | | | |
|---|---|---|---|
| 3,598,321 A | 8/1971 | Bobzin | |
| 3,638,865 A * | 2/1972 | McEneny et al. | 239/424 |
| 3,980,233 A * | 9/1976 | Simmons et al. | 239/400 |
| 4,170,108 A * | 10/1979 | Mobsby | 60/740 |
| 4,216,652 A * | 8/1980 | Herman et al. | 60/748 |
| 4,327,547 A * | 5/1982 | Hughes et al. | 60/39.463 |
| 4,447,010 A * | 5/1984 | Maeda et al. | 239/414 |
| 4,600,151 A * | 7/1986 | Bradley | 239/400 |
| 4,938,417 A * | 7/1990 | Halvorsen | 239/5 |
| 5,044,559 A * | 9/1991 | Russell et al. | 239/406 |
| 5,224,333 A | 7/1993 | Bretz et al. | |
| 5,307,635 A * | 5/1994 | Graves et al. | 60/740 |
| 5,505,045 A * | 4/1996 | Lee et al. | 60/748 |
| 5,697,553 A * | 12/1997 | Stotts | 239/8 |
| 5,701,732 A * | 12/1997 | Nesbitt et al. | 60/776 |
| 5,761,907 A | 6/1998 | Pelletier et al. | |
| 6,474,569 B1 * | 11/2002 | Brundish et al. | 239/406 |
| 6,688,534 B2 | 2/2004 | Bretz | |
| 6,883,332 B2 * | 4/2005 | Steinthorsson et al. | 60/776 |
| 7,406,827 B2 * | 8/2008 | Bernero et al. | 60/742 |
| 7,434,401 B2 * | 10/2008 | Hayashi | 60/743 |
| 7,658,074 B2 * | 2/2010 | Tuttle | 60/737 |
| 7,878,000 B2 * | 2/2011 | Mancini et al. | 60/740 |

(Continued)

OTHER PUBLICATIONS

Arthur H. Lefebvre, Gas Turbine Combustion, Hemisphere Publishing Corporation, Ch. 10, (pp. 371-461), 1983, Printed in the United States of America.

(Continued)

*Primary Examiner* — William H Rodríguez
(74) *Attorney, Agent, or Firm* — Scott D. Wofsy; Edwards Angell Palmer & Dodge LLP

(57) ABSTRACT

A fuel injector for a gas turbine includes an outer air path having a converging exit portion, and a fuel path inboard of the outer air path. An inner air path inboard of the fuel path includes an outer wall having a converging exit region and surrounds an axial core duct defining an axial air path having a diverging exit region. The inner air path creates a pressure drop near a fuel injection opening to promote mixing and atomization of fuel over a range of power levels, including low power operation.

20 Claims, 3 Drawing Sheets

U.S. PATENT DOCUMENTS

| | | | | |
|---|---|---|---|---|
| 2002/0134084 | A1* | 9/2002 | Mansour et al. | 60/740 |
| 2004/0148938 | A1 | 8/2004 | Mancini et al. | |
| 2005/0106520 | A1 | 5/2005 | Cornwell et al. | |
| 2006/0021350 | A1* | 2/2006 | Sanders | 60/743 |
| 2006/0248898 | A1 | 11/2006 | Buelow et al. | |
| 2009/0255258 | A1* | 10/2009 | Bretz et al. | 60/737 |
| 2010/0032501 | A1* | 2/2010 | Tarnogrodzki et al. | 239/422 |

OTHER PUBLICATIONS

Arthur H. Lefebvre, Atomization and Sprays, Hemisphere Publishing Corporation, Ch. 6, (pp. 201-272), 1989, Printed in the United States of America.

UK Search Report dated Jun. 24, 2009.

* cited by examiner

US 7,926,282 B2

PURE AIR BLAST FUEL INJECTOR

BACKGROUND OF THE INVENTION

1. Field of the Invention

The present invention relates to injectors and fuel nozzles for high temperature applications, and more particularly, to fuel injectors and nozzles for gas turbine engines used in aircraft.

2. Description of Related Art

A variety of devices and methods are known in the art for injecting fuel into gas turbine engines. Of such devices, many are directed to injecting fuel into combustors of gas turbine engines under high temperature conditions.

Gas turbines are employed in a variety of applications including electric power generation, military and commercial aviation, pipeline transmission and marine transportation. A common problem associated with fuel nozzles for gas turbines is the difficulty associated with performance at low fuel flows and/or air flow and pressure drop across the combustor. Prefilming airblast atomizers are a preferred approach for combustion systems operating at high pressures because they require lower fuel pump pressures and produce a well mixed finely atomized spray at standard operating conditions.

There are several technical problems associated with the combustion process in gas turbine engines. These problems include, for example, thermal efficiency of the burner/combustor, proper mixing of fuel and air, flame stabilization, the elimination of pulsations and noise, and the control of polluting emissions, especially nitrogen oxides ($NO_x$). Flame stabilization refers to fixing the position and intensity of the flame within the burner so as to eliminate pulsations and reduce noise, among other things. Stable combustion particularly at lean extinction points in gas turbine engines requires a cyclic process of combustion producing products, i.e., heat and free radicals, which are transported back upstream to the flame initiation point to facilitate the combustion process.

It is presently known to provide swirled air to the fuel-air mixture in order to improve flame stabilization and thereby stabilize the combustion process. Swirl stabilized combustion flows facilitate combustion by developing reverse flow about the centerline of the burner, which returns heat and free radicals back upstream to the un-burnt fuel-air mixture.

U.S. Patent Application Publication No. 2005/0106520 to Cornwell, et al., which is incorporated herein by reference in its entirety, describes a device for stabilizing combustion in gas turbine engines. A central bluff body flame holder extends through a mixing chamber that includes a plurality of swirl vanes for swirling air. Fuel injected into the swirling flow is mixed with air for combustion downstream. The central bluff body cooperates with a quart to anchor the flame to the bluff body and stabilize the flame over a wide range of operating conditions, including fluctuating fuel/air ratios. This design provides for flexibility and robustness in engine operation, while maintaining low $NO_x$ emissions.

Another problem associated with gas turbines is the difficulty associated with initiating fuel ignition during engine startup cycles and, for aviation, altitude relights. During these startup cycles, the fuel must be presented in a sufficiently atomized condition to initiate and support ignition. However, at engine start up, when the engine is gradually spooling up, the fuel and/or air pressure needed to atomize the fuel is generally unavailable. A broad range of fuel injection devices and methods has been developed to enhance the fuel atomization during engine ignition sequences and lean extinction points. One approach has been to employ air assist or airblast atomizers to facilitate the atomization process.

An exemplary air assist atomizer for gas turbine engines is described in U.S. Pat. No. 6,688,534 to Bretz, which is incorporated by reference herein in its entirety. The fuel delivery system includes an inner and outer air swirler with a fuel injection orifice there between. Rotating streams of air from the inner and outer air swirlers surround and shear fuel issuing from the fuel injection orifices therebetween to atomize the fuel for combustion. The air assist atomizer utilizes an air assist circuit where the atomizing air during ignition is supplemented by a separate external source. The high pressure air assist air is routed through a set of vanes to induce swirl and merged with the low pressure compressor discharge air to enhance the fuel atomization process to facilitate ignition.

Another way of improving engine emissions and efficiency is by using staged combustion. An exemplary lean, direct injection atomizer for gas turbine engines is described in U.S. Patent Application Publication No. 2006/0248898 to Buelow et al., which is incorporated by reference herein in its entirety. The lean direct injection fuel nozzle includes an outer main fuel delivery system and an inner pilot fuel delivery system. Each of the main and pilot fuel delivery systems includes an inner and outer air swirler with a fuel injection orifice therebetween. Rotating streams of air from the inner and outer air swirlers surround and shear fuel issuing from the fuel injection orifices therebetween to atomize the fuel for combustion. During low power operation, only the pilot combustion zone is fueled, and during high power operation, both pilot and main combustion zones are fueled. The pilot combustion zone provides low power operation as well as good flame stability at high power operation. The main combustion zone operates in a fuel-lean mode for reduced flame temperature and low pollutant formation, particularly $NO_x$. During high power operation, the ignition source for the main fuel-air mixture comes from the pilot combustion zone.

Another exemplary fuel injection nozzle is shown in FIG. 1. Nozzle 1 includes upstream end 2 and downstream end 3. Inner air swirler 4 and outer air swirler 5 add swirl to air passing through from a compressor upstream. This creates an expanding vortex where the air exits the fuel nozzle. The swirling air entrains fuel from fuel outlet 6 and the resulting volumetric expansion associated with vortex flow further strains the fuel sheet, shearing the fuel sheet into droplets. As the vortex progresses into the combustor downstream of nozzle 1, the pressure gradient becomes such that the vortex cannot sustain itself and it collapses. The vortex consequently recirculates along the low-pressure centerline of the vortex. Typically the vortex will have a tendency to be unsteady about its centerline. Pure air blast injectors of the prior art utilize a wake region from a center-body of an axial swirler, such as center-body 7, to help stabilize the centerline of the vortex. Alternatively, in the case of a radial in-flow swirler (not shown), a low-pressure region from the inlet has been used to help stabilize the centerline of the vortex.

Fuel is introduced via a prefilming chamber (upstream of fuel outlet 6) functioning to shear angularly injected fuel into a uniform sheet. This uniform sheet proceeds along the prefilming surface to a fuel exit annulus 6, at which point the fuel enters into a cross-flowing air stream. The cross-flowing air stream has much higher kinetic energy that interacts with and excites the low kinetic energy fuel sheet. This interaction shears and accelerates the fuel sheet, creating multiple modes of instability, which ultimately results in the fuel sheet breaking into ligaments of fuel. These fuel ligaments are similarly excited and broken into droplets. This is the primary mode of droplet formation, which requires the cross-flowing air stream to have enough energy to cause excitation. The more effective the energy transfer from air to fuel, the smaller the diameter of droplets, which inevitably results in a more uniform fuel/air mixture that more readily combusts given an adequate ratio of fuel to air. At lower power conditions however, there is less momentum in the compressor discharge air, leaving a deficiency in the ability to excite the fuel film which therefore results in droplets that are not sufficiently small.

Such conventional methods and systems generally have been considered satisfactory for their intended purpose. However, there still remains a continued need in the art for a nozzle or fuel injector that allows for improved excitation of the fuel film at low power conditions. The present invention provides a solution for these problems.

SUMMARY OF THE INVENTION

The subject invention is directed to a new and useful air blast fuel injector for gas turbine engines. The air blast fuel injector includes an outer air path having a converging exit portion, and a fuel path inboard of the outer air path. The injector further includes an inner air path inboard of the fuel that path includes an outer wall having a converging exit region. The inner air path surrounds an axial core duct. The axial core duct defines an axial air path with a diverging exit region.

In a preferred embodiment, the diverging exit region of the axial core duct is generally coextensive with the converging exit portion of the inner air path. It is also contemplated that the diverging exit region of the axial core duct can terminate at any suitable location upstream or downstream from a terminal end of the converging exit portion of the inner air path. It is contemplated that the fuel path can include an upstream fuel swirler and a downstream prefilming surface. The fuel path can include a prefilming injector having a fuel exit proximate the converging exit portion of the outer air path. The outer air path can include an air swirler. It is also possible for the outer air path to include a dual air swirler.

An axial air swirler can be disposed between the outer wall of the inner air path and the axial core duct. In such a case, the axial air swirler can include vanes configured to impart a flow angle of between about 0° to about 60° relative to a central axis defined by the axial swirler. The axial air swirler can be dimensioned to route between about 50% and about 95% of inner air path mass flow through the axial air swirler with the balance of the mass flow routed through the axial core duct.

It is envisioned that an air blast fuel injector in accordance with the invention may include a core swirler adjacent an upstream end of the axial core duct. In such a case, the core swirler may be an axial air swirler, radial swirler, or any other suitable type of swirler. In certain embodiments, the core swirler includes a central bore defining a flow path along a central axis of the core swirler. Moreover, it is also contemplated that at least one off-center radial aperture can be defined in the axial core duct adjacent the diverging exit region thereof. A plurality of such off-center apertures can communicate between an inner axial swirler and the axial air path, the plurality of off-center apertures being configured and adapted to impart swirl on a flow exiting the axial core duct.

These and other features of the fuel nozzle and system of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the fuel nozzle of the subject invention without undue experimentation, preferred embodiments thereof will be described in detail herein below with reference to certain figures, wherein.

DETAILED DESCRIPTION OF THE PREFERRED EMBODIMENT

Figure 1:
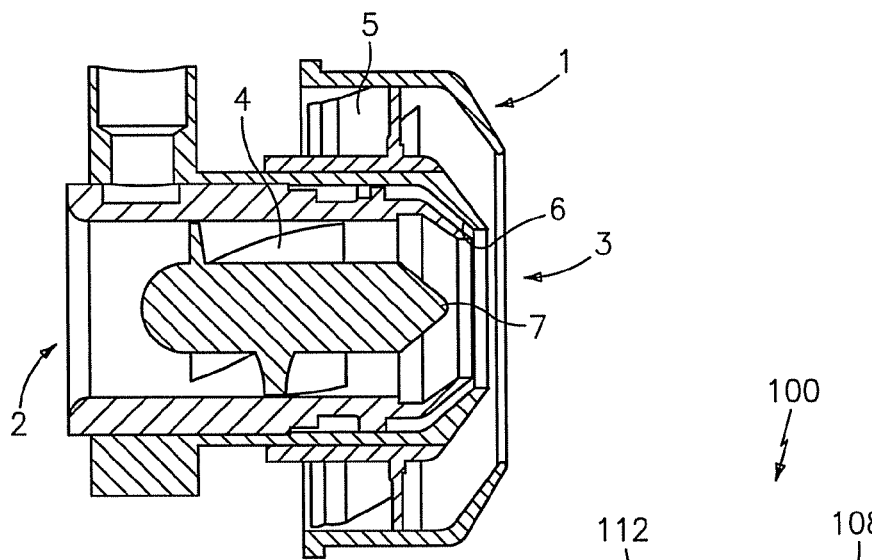
FIG. 1 is a cross-sectional side elevation view of a prior art airblast fuel injector nozzle, showing the solid central-body of an axial swirler in the inner air path.

Reference will now be made to the drawings wherein like reference numerals identify similar structural features or aspects of the subject invention. In accordance with the invention, an air blast fuel injector is provided. The air blast fuel injector includes an outer air path having a converging exit portion and a fuel path inboard of the outer air path. An inner air path inboard of the fuel path includes an outer wall having a converging exit region. The inner air path surrounds an axial core duct that defines an axial air path having a diverging exit region.

Figure 2:
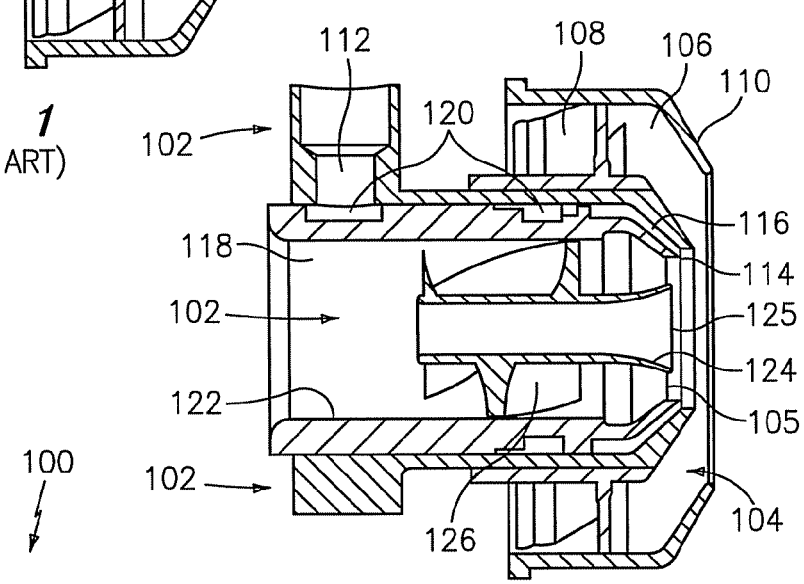
FIG. 2 is a cross-sectional side elevation view of a first representative embodiment of a nozzle constructed in accordance with the present invention, showing an axial core duct in the inner air path.

For purpose of explanation and illustration, and not limitation, a partial view of an exemplary embodiment of the injector or nozzle in accordance with the invention is shown in FIG. 2 and is designated generally by reference character 100. Other embodiments of a nozzle in accordance with the invention, or aspects thereof, are provided in FIGS. 3-8, as will be described. The system of the invention can be used in gas turbine engines utilizing a rich primary zone and swirl stabilized combustion, or in any other suitable application, for enhanced fuel atomization during engine start up and sustained stable combustion.

In accordance with the invention, an inlet portion 102 is provided at an upstream end of the nozzle 100 for receiving high-pressure air from the compressor. An outlet portion 104 is provided at a downstream portion of nozzle 100 for issuing atomized fuel into the combustor of the engine. An outer air path 106 is provided with an axial air swirler 108 and converging air cap 110 near the outlet portion. Outer air path 106 imparts swirl to an air stream passing therethrough, while directing the air stream in an axially inward direction at exit portion 104.

Fuel enters nozzle 100 through fuel inlet 112, which communicates with a fuel passage formed in the feed arm of the injector (not shown, but see e.g. U.S. Patent Application Publication No. 2006/0248898 to Buelow et al.), and passes through an internal fuel path 120 inboard of outer air path 106 to a fuel exit 114 at the downstream portion 104 of nozzle 100. A prefilming chamber 116 in the internal fuel passage directs a sheet of fuel radially inward as it exits at annular opening 114. It is also possible to include a fuel swirler to impart swirl to fuel passing through prefilming chamber 116. Those skilled in the art will appreciate that the internal fuel passage can include an upstream fuel swirler and a downstream prefilming surface, or any other suitable fuel passage configuration, without departing from the spirit and scope of the invention.

Inner air path 118, inboard of the fuel path 120, allows passage of air from upstream portion 102 to downstream portion 104 through the axially inner portion of nozzle 100. Inner wall 122 of inner air path 118 converges near exit region 104. Inner air path 118 also includes axial core duct 124, which is generally surrounded by inner wall 122. Axial core duct 124 defines an air path along the axis of nozzle 100 with an exit region 125 that diverges near exit portion 104 of nozzle 100.

Inner axial swirler 126 imparts swirl to air passing through inner air path 118 but outside core duct 124. The vanes of axial swirler 126 are configured to impart a flow angle of between about 0° and about 60° relative to the central axis of the axial swirler. In a preferred embodiment, the vanes impart a flow angle of about 30°. Those skilled in the art will readily appreciate how to apply any suitable vane configuration imparting any suitable flow angle without departing from the spirit and scope of the invention. Swirl is imparted to passing compressor discharge air via inner swirler 126 and outer swirler 108 working in parallel. Moreover, it is possible for the vanes of inner axial swirler 126 to impart swirl that is either co-rotating or counter-rotating with swirl imparted by outer axial swirler 108.

Air leaving swirler 126 must exit through annular exit 105 which is a constricted opening between the converging portion of inner wall 122 and diverging portion of core duct 124. This annular exit 105 is to reduce the air flow path area to create a pressure drop in the inner air flow near the injection point of fuel from fuel outlet 114. The result is a smooth, accelerated flow exiting annular exit 105 on the inboard side of a fuel sheet exiting fuel outlet 114. This smooth, accelerated air flow is utilized for increasing atomization of fuel at low power by concentrating a higher amount of velocity into the passing air current which consequently produces smaller fuel droplet sizes that aid in combustion initiation and stabilization.

Axial core duct 124 controls how recirculated exhaust gases circulating within the combustor downstream of nozzle 100 are mixed with air and fuel flowing from the nozzle, ultimately creating an aerodynamically stable shear zone suitable for combustion over a wide range of engine conditions. A low pressure region is generated by the swirl of the nozzle flow and this draws post combustion gases back into the combustion zone. The design of the injector and combustor contribute to the amount of recirculation gasses drawn back into the combustion process. The inner path air (or core flow) is controlled by nozzle design to introduce the inner air into the forward combustor in such a manner that the recirculated exhaust gases are controlled by the inner air circuit.

The exit of core duct 125 is substantially coextensive with the fuel exit 114 and the exit of outer air path 106 in the axial direction, and preferably slightly upstream of fuel exit 114 and the exit of outer air path 106. The axial position of the core duct is important to accelerate the compressor discharge air along a smooth continuous contour to a point where the fuel exits the prefilmer to enhance the fuel film atomization. If the core duct is too far upstream, the air does not directly impinge the fuel sheet, the flow field is distorted and atomization and lean extinction are compromised, too far downstream and the interaction between the inner air and outer air circuits are affected and the core duct is exposed to hot combustion gasses. Thus, while exit 125 of core duct 124 is shown substantially coextensive with exit 105 of inner air path 118, those skilled in the art will readily appreciate how to optimize the location of the core duct for other nozzle designs without departing from the spirit and scope of the invention.

The tip design for core duct 124 is critical in that it determines how close the recirculated exhaust gases come to the nozzle tip, which controls the concentration of highly reactive chemical species feeding into the combustion zone. In addition, the axial location of the core duct exit can affect the penetration of combustion recirculation gasses back into the flame structure. The core duct contour combined with the swirl strength of the axial core swirler 128, when included in the core duct, facilitate recirculation gasses creating a tighter flame kernel extending the atomizer's lean extinction performance. Bore 130 through the axial swirler, when included in the core duct, can play a significant role in keeping the flame front from coming upstream and anchoring on the outlet or inside the core duct, depending on the swirl strength of the core swirler. The combination of core duct contour, core swirl and bore hole in the tip design controls the local free-stream turbulence levels, the three-dimensional velocity field, and the temperature of the fuel/air mixture immediately prior to combustion, all of which directly affect flame stability.

Figure 5:
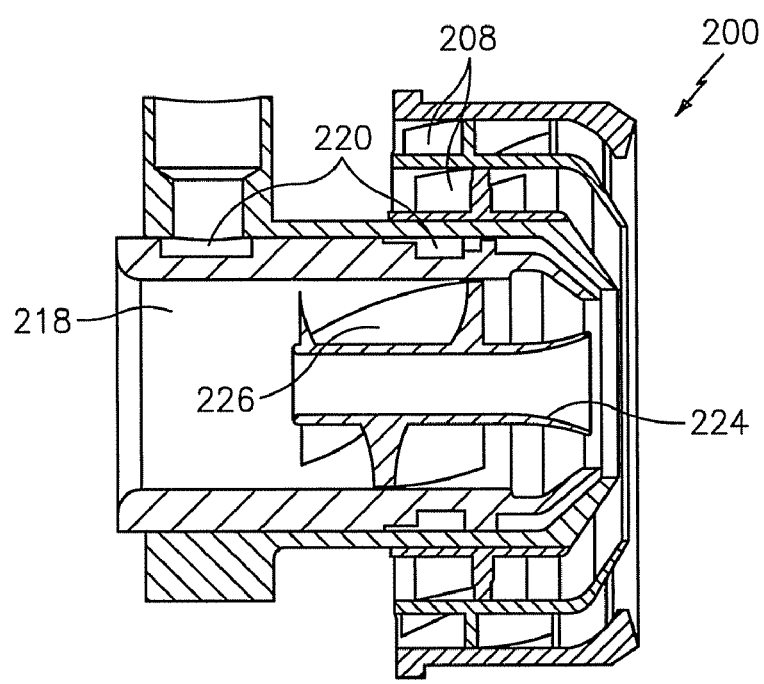
FIG. 5 is a cross-sectional side elevation view of a second representative embodiment of a nozzle constructed in accordance with the present invention, showing a dual air swirler in the outer air path.
Figure 8:
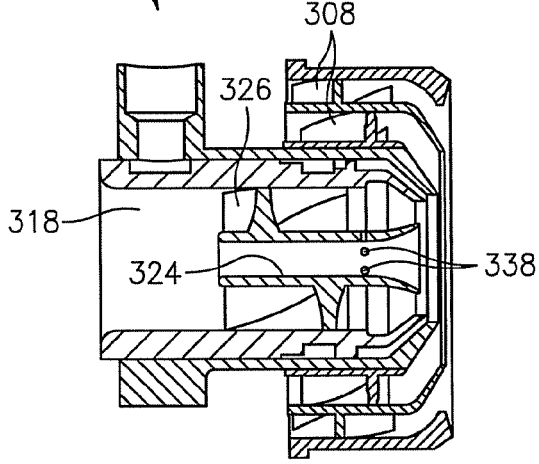
FIG. 8 is a cross-sectional side elevation view of the nozzle of FIG. 6, showing a core duct with off-center bores adjacent the downstream diverging exit of the core duct in lieu of an axial core swirler.

Even when no core duct swirler is present, as shown for example in FIGS. 2, 5, and 8, the core duct can still provide benefits in ignition and flame stability when compared to previously known nozzles. Performance depends on the design of the inner air circuit, inner air path, and ratio of inner air core to inner air path, including the contour of the diverging exit region. Adding a core air swirler can provide better ignition and flame stability depending on nozzle design, nozzle size, engine dome swirler design and combustor design. Determination of whether addition of a core swirler within a core duct provides significant benefits in a given nozzle design can be determined through experiment with a combustor set rig at atmospheric conditions.

The core also reduces thermal distress in that surfaces that in prior designs would be exposed to hot combustion gases are cooled with compressor discharge air in nozzle 100. Multiple flow fields can be developed based upon the needs for the specific combustion system requirements, by altering the contour of the core air discharge. The core duct 124 also allows for reduction of overall injector diameter, owing to the diffuser effect associated with the inner air accelerated through the nozzle because of the reduced exit area of the inner air path immediately outside the core duct contour. Other benefits include greater control of the inner air circuit flow field and increased air flow metering capability.

Outer wall 122 of inner air path 118 and core duct 124 are dimensioned to route between about 50% and about 95% of inner air path mass flow through axial air swirler 126 with the balance of mass flow being routed through core duct 124. Those skilled in the art will readily appreciate, however, that nozzle 100 can be configured to accommodate any suitable ratio of mass flow in axial swirler 126 to mass flow in core duct 124 without departing from the spirit and scope of the invention. The split between core air and inner air is critical to balance the nozzle ignition and lean extinction properties. Excessive core air decreases the amount and energy of air directly impacting the fuel stream at ignition. Insufficient core air causes insufficient combustion gasses to be recirculated, decreasing the atomizers lean extinction properties. The combination of core air to inner air split can be manipulated to provide optimum ignition and lean extinction performance. The optimum inner air split will vary depending on combustor design, nozzle geometry and/or envelope and fuel and air flow requirements. Actual engine tests can be used to determine optimal inner air split for a given combustor design, nozzle design, and air/fuel flow requirements.

Figure 3:
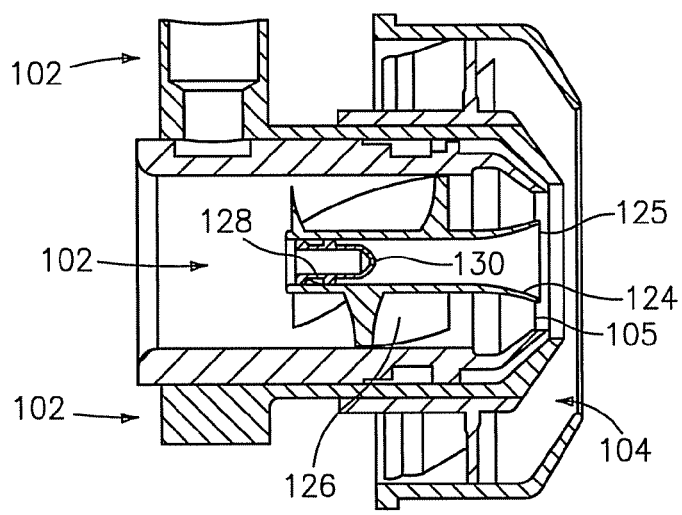
FIG. 3 is a cross-sectional side elevation view of the nozzle of FIG. 2, showing an axial core swirler disposed within the core duct.
Figure 4:
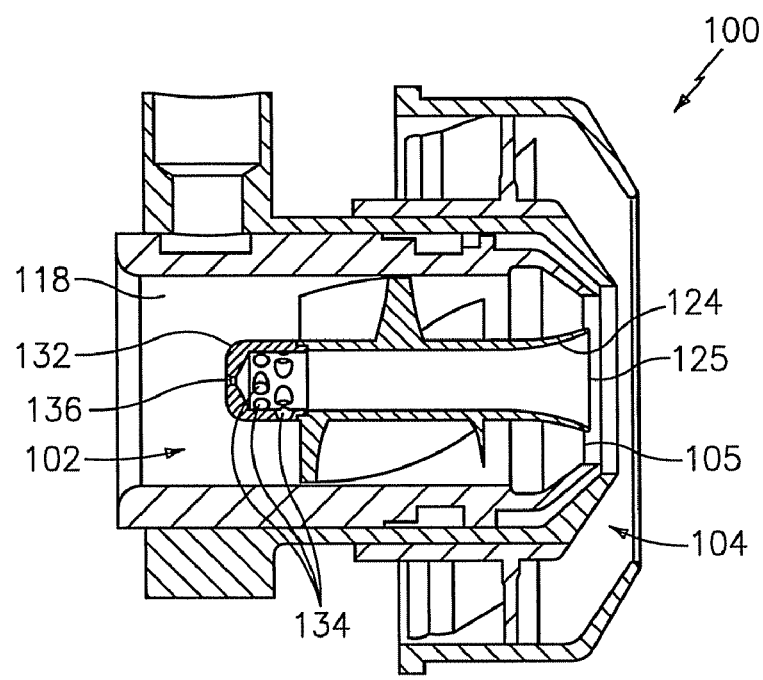
FIG. 4 is a cross-sectional side elevation view of the nozzle of FIG. 2, showing a radial core swirler disposed at the upstream end of the core duct.

As shown in FIG. 3, it is also possible for core duct 124 to include an axial core swirler 128 to impart swirl to the core air flow. Axial core swirler 128 has swirl fins of a known type on its exterior, and a bore 130 along the axis of nozzle 100, which is an optional feature that provides an axial flow to help with flame stability in the combustor. FIG. 4 shows nozzle 100 with a radial core swirler 132 disposed on the inlet end of core duct 124. Radial core swirler 132 includes a plurality of off-center bores 134 communicating between the main portion of inner air path 118 and the interior of core duct 124. Air entering core duct 124 through bores 134 is swirled because bores 134 are set off from radii of swirler 132. An optional axial bore 136 allows for an axial flow for helping stabilize flows in the combustor.

While axial core swirlers are optional, they provide the benefit of helping anchor flames and improving flame stability in the recirculation zone of the combustor. Moreover, while core swirlers have been described above with examples of axial and radial swirler configuration, those skilled in the art will readily appreciate that any suitable swirler type can be used without departing from the spirit and scope of the invention.

Figure 6:
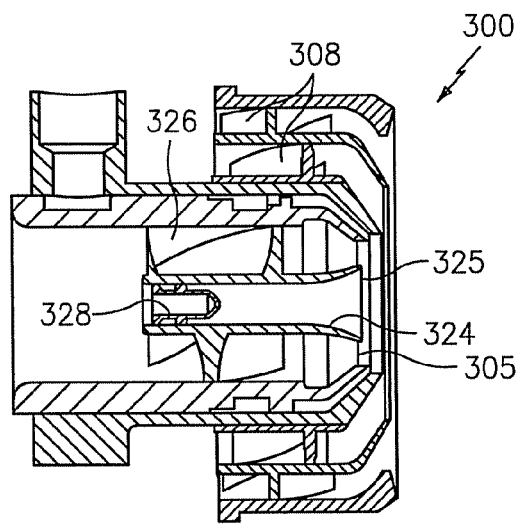
FIG. 6 is a cross-sectional side elevation view of a third representative embodiment of nozzle constructed in accordance with the present invention, showing an axial core swirler disposed at the up stream end of the core duct.
Figure 7:
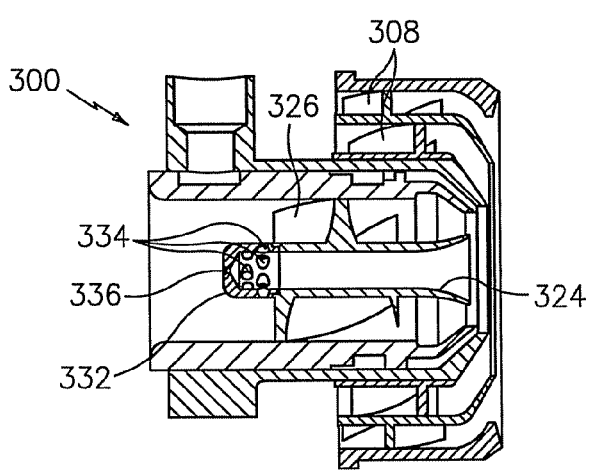
FIG. 7 is a cross-sectional side elevation view of the nozzle of FIG. 6, showing a core duct having a radial core swirler disposed at the upstream end thereof in lieu of an axial core swirler.

FIG. 5 shows another embodiment of an air blast fuel injector nozzle in accordance with the present invention. Nozzle 200 is similar to nozzle 100 above in most respects, including having an inner air path 218 with a core duct 224 within an axial swirler 226 inboard of an internal fuel path 220. However, nozzle 200 has a dual outer air swirler 208. Dual swirlers provide an additional means of imparting swirl to airflows around the fuel injection zone. Nozzle 200 can be used without a core duct swirler, as shown in FIG. 5, or with a core duct swirler, as illustrated in FIGS. 6 and 7. FIG. 6 shows nozzle 300 with a core duct swirler 328 disposed on the inlet end of core duct 324 similar to FIG. 3 in most respects except for a dual outer air swirler 308. FIG. 7 shows a radial core swirler 332 disposed on the inlet end of core duct 324 with radial swirl bores 334 and axial bore 336 similar to FIG. 4 in most respects except for a dual outer air swirler 308. Those skilled in the art will readily appreciate that an axial or any other suitable type of core duct swirler can be used in nozzle 300 without departing from the spirit and scope of the invention.

FIG. 8 shows nozzle 300 with off-center apertures or bores 338 adjacent the diverging exit portion of core duct 324. Bores 338 communicate between inner axial swirler 326 and the interior of core duct 324, allowing air to pass from outside the core duct into the axial flow within the interior of core duct 324. Bores 338 impart an element of swirl to core air leaving core duct 324 because they are set off from radii of core duct 324. While shown in conjunction with nozzle 300 with dual outer swirlers 308, it is also possible to use apertures like bores 338 in core duct 124 of nozzle 100. Moreover, bores 338 can be used in core ducts with or without separate core swirlers.

Those skilled in the art will readily appreciate that the various outer, inner, fuel, and core swirlers, when used, can be arranged for co-rotating swirl, counter-rotating swirl, or any suitable combination thereof without departing from sprit and scope of the invention. Any suitable number of additional swirlers can be used in the inner air path, outer air path, or core duct. It is not necessary for swirlers of inner and outer air paths to be of an axial type, as those skilled in the art will readily appreciate how to use radial swirlers, or any other suitable type of swirler or combination of any suitable swirler types, in lieu of inner and/or outer axial swirlers without departing from the spirit and scope of the invention. The nozzles described above are configured for rich burn combustors, however, those skilled in the art will readily appreciate that the invention can also be practiced in lean burn combustor applications, or in any other suitable type of combustor application. Moreover, while specific exemplary types of nozzles have been depicted herein, those skilled in the art will readily appreciate that the invention can be applied to piloted injectors, hybrid injectors, dual injectors, pure injectors, or any other suitable type of prefilming injectors or nozzles without departing from the spirit and scope of the invention. Moreover, any suitable combination of features described herein can be included in a nozzle without departing from the spirit and scope of the invention.

The methods and systems of the present invention, as described above and shown in the drawings, provide for an air blast fuel injector with superior properties including improved atomization due to an air pressure drop at the injection point of the fuel. This improved atomization leads to improved emissions and operability, including stability at low power operation, ignition, and lean conditions.

While the apparatus and methods of subject invention have been shown and described with reference to preferred embodiments, those skilled in the art will readily appreciate that changes and/or modifications may be made thereto without departing from the spirit and scope of the subject invention.

What is claimed is:

1. An air blast fuel injector comprising:
    a) an outer air path having a converging exit portion;
    b) a fuel path inboard of the outer air path; and
    c) an inner air path inboard of the fuel path, the inner air path including an outer wall having a converging exit region and surrounding an axial core duct defining an axial air path having a diverging exit region.

2. An air blast fuel injector as recited in claim 1, wherein the diverging exit region of the axial core duct is generally coextensive with the converging exit portion of the inner air path.

3. An air blast fuel injector as recited in claim 1, wherein the diverging exit region of the axial core duct terminates upstream from a terminal end of the converging exit portion of the inner air path.

4. An air blast fuel injector as recited in claim 2, further comprising an axial air swirler disposed between the outer wall of the inner air path and the axial core duct.

5. An air blast fuel injector as recited in claim 4, wherein the axial air swirler includes vanes configured to impart a flow angle of between about 0° to about 60° relative to a central axis defined by the axial swirler.

6. An air blast fuel injector as recited in claim 4, wherein the axial air swirler is dimensioned to route between about 50% and about 95% of inner air path mass flow through the axial air swirler with the balance of the mass flow routed through the axial core duct.

7. An air blast fuel injector as recited in claim 4, wherein the fuel path includes an upstream fuel swirler and a downstream prefilming surface.

8. An air blast fuel injector as recited in claim 1, further comprising a core swirler adjacent an upstream end of the axial core duct.

9. An air blast fuel injector as recited in claim 8, wherein the core swirler is an axial air swirler.

10. An air blast fuel injector as recited in claim 8, wherein the core swirler is a radial air swirler.

11. An air blast fuel injector as recited in claim 8, wherein the core swirler includes a central bore defining a flow path along a central axis of the core swirler.

12. An air blast fuel injector as recited in claim 1, wherein the outer air path includes an air swirler.

13. An air blast fuel injector as recited in claim 1, wherein the outer air path includes a dual air swirler.

14. An air blast fuel injector as recited in claim 1, wherein at least one off-center radial aperture is defined in the axial core duct adjacent the diverging exit region thereof.

15. An air blast fuel injector for a gas turbine engine comprising:
   a) an outer air path including an outer air swirler and having a converging exit portion;
   b) a fuel path inboard of the outer air path including a fuel swirler and having a converging prefilming surface inboard of the converging exit portion of the outer air path;
   c) an inner air path inboard of the fuel path including an axial swirler; and
   d) an axial core duct inboard of the inner air path and defining an axial air path having a diverging exit region.

16. An air blast fuel injector for a gas turbine engine as recited in claim 15, further comprising a core swirler disposed proximate an upstream end of the axial core duct.

17. An air blast fuel injector for a gas turbine engine as recited in claim 16, wherein the core swirler includes a central bore defining a flow path along a central axis of the core swirler.

18. An air blast fuel injector for a gas turbine engine as recited in claim 15, wherein the axial swirler is dimensioned to route between about 50% and about 95% of inner air path mass flow through the axial swirler with the balance of the mass flow routed through the axial core duct.

19. An air blast fuel injector for a gas turbine engine comprising:
   a) an outer air path having a converging exit portion;
   b) a fuel path inboard of the outer air path, the fuel path including a prefilming surface inboard of the converging exit portion of the outer air path;
   c) an inner air path inboard of the fuel path, the inner air path including an inner axial swirler defined between an outer wall having a converging exit region and an axial core duct defining an axial air path with a diverging exit region; and
   d) an axial core duct swirler disposed in an upstream portion of the axial core duct.

20. An air blast fuel injector for a gas turbine engine as recited in claim 19, wherein the axial core duct swirler includes an axial bore defining a flow path along a central axis defined by the inner air path.

* * * * *